United States Patent [19]

Seno

[11] Patent Number: 4,854,279
[45] Date of Patent: Aug. 8, 1989

[54] THREE CHAMBER CONTINUOUS COMBUSTION ENGINE

[76] Inventor: Cornelio L. Seno, Merryland Village, 375 J. Rizal Street, 1501 Mandaluyong, Metro Manila, Philippines

[21] Appl. No.: 265,022

[22] Filed: Sep. 27, 1988

Related U.S. Application Data

[63] Continuation-in-part of Ser. No. 135,704, Dec. 21, 1987, abandoned.

[51] Int. Cl.⁴ ............................................. F02B 53/00
[52] U.S. Cl. .................................... 123/204; 123/231; 418/255
[58] Field of Search ...................... 123/204, 231, 243; 418/147, 255

[56] References Cited

U.S. PATENT DOCUMENTS

| | | | |
|---|---|---|---|
| 1,977,780 | 10/1934 | Stageberg | 418/255 X |
| 2,062,576 | 12/1936 | Johnson | 123/231 X |
| 2,452,471 | 10/1948 | Jones | 418/255 |
| 3,057,157 | 10/1962 | Close | 123/204 X |

FOREIGN PATENT DOCUMENTS

| | | | |
|---|---|---|---|
| 2125516 | 12/1972 | Fed. Rep. of Germany | 123/243 |
| 3145814 | 5/1983 | Fed. Rep. of Germany | 123/204 |
| 1427038 | 3/1976 | United Kingdom | 123/243 |

Primary Examiner—Michael Koczo

[57] ABSTRACT

A three chamber continuous combustion engine is a rotary vane, concentric rotor type of internal combustion engine having a burner assembly, three crescent shaped static chambers serving as compressor, expander and oil pump; and six dynamic chambers defined by the three intersecting blades slidably inserted in the rotor slots, carrying combustion media through the continuous combustion cycle consisting of intake, compression, air storage, continuous combustion, expansion, decompression and exhaust.

1 Claim, 6 Drawing Sheets

THREE CHAMBER CONTINUOUS COMBUSTION ENGINE

CROSS-REFERENCE TO RELATED APPLICATION

The present invention is a continuation-in-part of U.S. patent application Ser. No. 135,704, abandoned. After fabricating and testing three versions of the original invention, the applicant concludes that it is an impractical design for an engine. The present invention is conceived to solve the problems and shortcomings of the original invention to come up with a practical, cheap and efficient rotary engine.

BACKGROUND OF THE INVENTION

1. Field of the Invention

The present invention relates to the field of internal combustion engines and in particular to the field of rotary vane, concentric rotor internal combustion engines.

2. Description of the Prior Art

Several internal combustion rotary engines were evolved with the end view of competing with the conventional internal combustion reciprocating engine, but to no avail because of inherent problems in one or combination of the following areas: sealing, lubrication, cooling, valving of combustion media, fuel economy, air pollution and manufacturing cost. Their major difference is that the power output of the rotary engines is directly rotational as opposed to the linearly back and forth movement of the piston of the reciprocating engine.

SUMMARY OF THE INVENTION

The internal surface of the shell is constructed from three equidistant circular arcs and their tangent lines to form a generally equilateral triangle whose corners are replaced by circular arcs. A spool shaped segmented rotor with three intersecting blades inserted in its slots is rotatably mounted inside the sheel and two end walls. Three cresent shaped static chambers are formed between the above parts, serving as air compressor, expander and oil pump. Six dynamic chambers separated by the intersecting blades, revolve around the central axis carrying combustion media that undergoes thermodynamic processes of continuous combustion cycle, consisting of isobaric and isothermal air intake as well as isentropic air compression inside the first crescent shaped static chamber; isobaric, isochoric, isothermal and isentropic air storage at high pressure inside the air tank; isobaric and isochoric continuous combustion of fuel by air inside the flame tube; isobaric, isothermal and isentropic expansion, isochoric decompression, as well as isobaric and isothermal exhaust in the second crescent shaped static chamber. Sealing of the dynamic chambers is satisfactory because the radial edges of the blades are slidably inserted in radial notches of the rotating end plates; the axial edges of each blade are always substantially in contact with the internal surface of the shell and they are pressed against the shell by centrifugal force when sealing is necessary during air compression, expansion and oil discharge; and the oil coolant and lubricant occupying clearances between rubbing parts serves as effective seal between high and low pressure regions.

The object of this invention is a simple, cheap and efficient rotary engine. Specific objects are minimum amount of oil in the combustion media, anchorage of flame in the flame tube, optimum lubrication, cooling and sealing by oil, and optimum sealing between high pressure region and low pressure region. Other objects, features and advantages of the present invention will be apparent in the following specification.

BRIEF DESCRIPTION OF DRAWINGS

A better understanding of the present invention can be obtained by studying the following detailed description, taken in conjunction with the accompanying drawings, in which.

Similar numerals of reference indicate corresponding parts in the different figures of the drawings.

DESCRIPTION OF PREFERRED EMBODIMENT

The transverse section of the invention shows that the interior of the shell is constructed of three equally spaced circular arcs and their tangent lines. The rotor rotatably fits inside the shell while the three intersecting and oscillating blades inserted in the rotor slots are always in satisfactory sealing contact with the internal surface of the shell and the end plates. There result three crescent shaped static chambers functioning as air compressor, expander and oil pump, as well as six dynamic chambers that move the combustion media through the various thermodynamic processes in the continuous combustion cycle.

The symmetrical three chamber continuous combustion engine has two basic parts. The first is the rotating assembly consisting of two shafts, two end plates, six rotor segments and three intersecting blades. The second is the housing assembly comprising the air tank, flame tube, fuel nozzle, spark plug, shell and two identical sets of end sidings, bearings, bearing covers, seals, stud bolts, nuts and washers. The other necessary parts excluded in the description of the embodiment of the invention are conventional and widely understood.

The three chamber continuous combustion engine is operated as follows. A motor starter brings the engine to self-sustaining speed after which it is disengaged from the engine. The first static chamber inducts air through the air intake port, compresses it, and delivers it at high pressure through the air discharge port into the air tank. Pressurized air flows with cooling effect into the flame tube through several holes, and then mixes with fuel discharged and atomized by the fuel nozzle. Initially, the spark plug is activated to ignite the fuel-air mixture. Once the engine attains self-sustaining speed, the spark plug is disconnected from the power source. The combustion by-product rushes into the second static chamber through the exhaust intake port.

Mechanical energy is imparted to the rotor on account of pressure gradient across the blades. After achieving maximum displacement, it through the exhaust discharge port. Oil pumping in the third crescent shaped static chamber aids in cooling, lubrication and sealing.

A more detailed description of the preferred embodiment of the invention is presented.

1. CONSTRUCTION

The invention is a rotary vane engine based on simple geometry. The following analysis assumes that the thickness of the blades 31, 32 and 33 is 0.1R, where R in this expression and in the following formulas symbolizes for rotor radius.

a. Construction of Shell, Rotor and Blades

Figure 1:
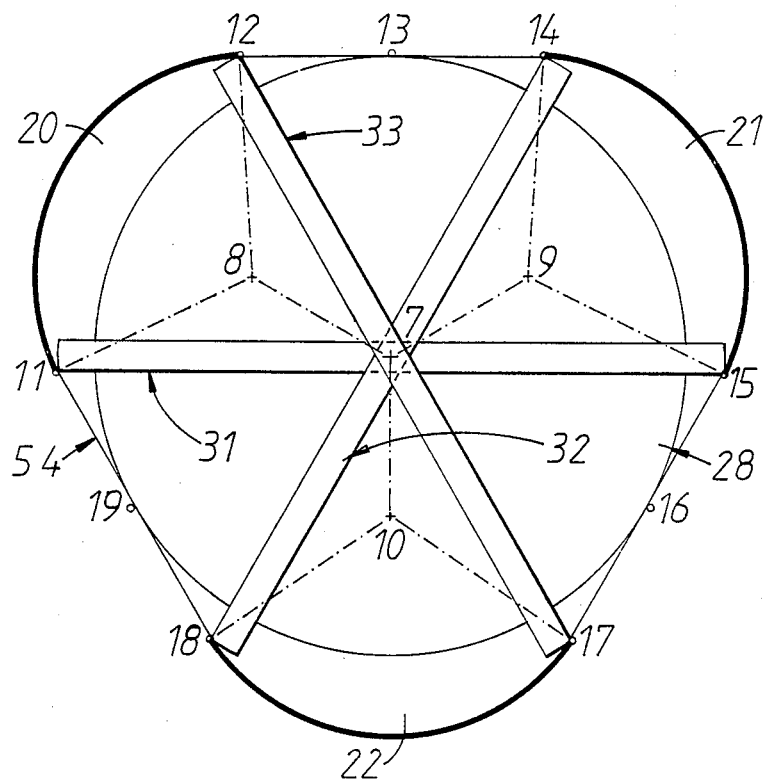
FIG. 1 is the schematic diagram of the transverse section of the three chamber continous combustion engine.

FIG. 1 is the schematic diagram of the transverse section of the invention. The shell 54 represented by the outer curve 11-12-13-14-15-16-17-18-19, is generally an equilateral triangle whose corners are replaced by three equidistant 120° degree circular arcs 11-12, 14-15 and 16-18. The circle 13-16-19 stands for the rotor 28. The rectangles 11-7-15, 12-7-17 and 14-7-18 represent the three intersecting blades 31, 32 and 33. Point 7 is the center of both curve 11-12-13-14-15-16-17-18-19 and circle 13-16-19. Points 8, 9 and 10 are equidistant with each other and are equally spaced from Point 7 by a constant distance d equal to:

$$d = \frac{R}{(\cotangent 33° + \cotangent 23°) \cosine 27° \sine 33°} = 0.529R$$

Angles L8-7-9, L9-7-10 and L10-7-8 are each equal to 120 degrees. About Points 8, 9 and 10 are struck three circular arcs 11-12, 14-15 and 17-18 having uniform radius r equal to:

$$r = \frac{R}{(\cotangent 33° + \cotangent 23°) \cosine 27° \sine 23°} = 0.737R$$

The three circular arcs 11-12, 14-15 and 17-18 are connected by their tangent lines 12-13-14, 15-16-17 and 18-19-11. Angles L11-8-12, L14-9-15 and L17-10-18 are each equal to 112 degrees. The curve 11-12-13-14-15-16-17-18-19 in the silhouette of the internal surface of the shell 54. The intersections of the circular arcs and their tangent lines, namely, Points 11, 12, 14, 15, 17 and 18 have a constant distance c from Point 7 equal to:

$$c = R/\cosine 27 \text{ degrees} = 1.122R.$$

A rectangle 0.1R thick and 2c or 2.244R long whose center passes through Point 7, touches the curve 11-12-13-14-15-16-17-18-19 at both ends at all angular orientations.

b. Three Cresent Shaped Static Chambers

Figure 4:
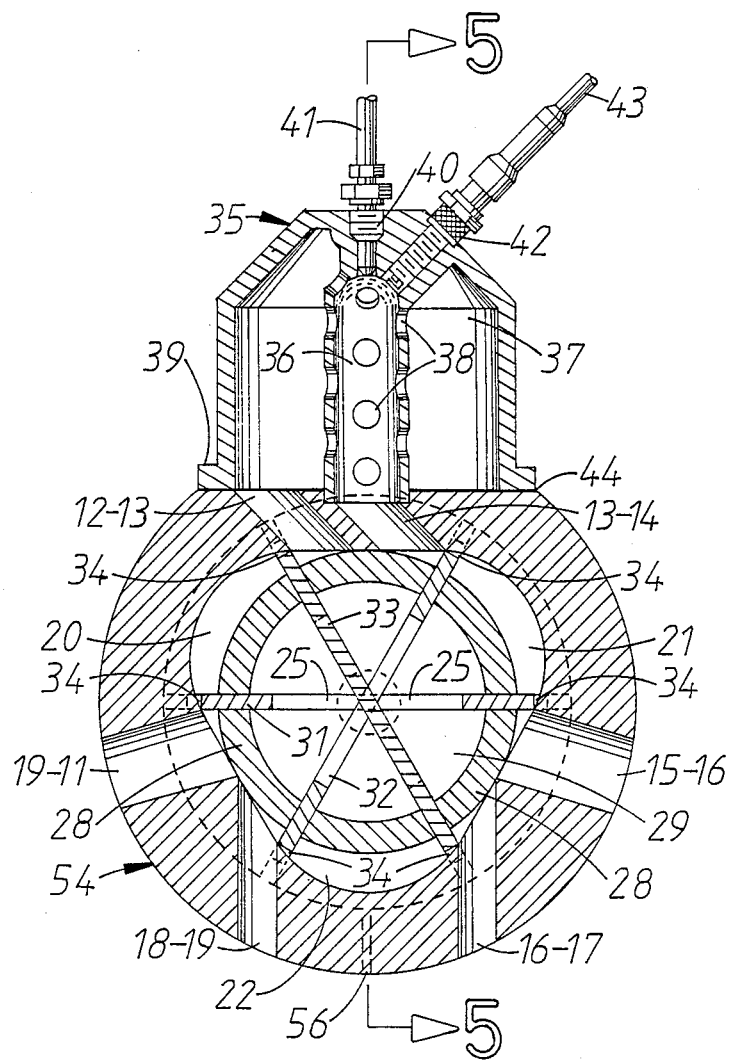
FIG. 4 is the transverse section of the invention along section Line 4—4 of FIG. 5.

Inbetween the curve 11-12-13-14-15-16-17-18-19 and the circle 13-16-19 are three cresent shaped regions 20, 21 and 22, representing the three static chambers inside the three chamber continuous combustion engine (See FIG. 4). The first crescent shaped static chamber 20 serves as compressor communicating with the atmosphere through the air intake port 19-11 and with the air tank 37 through the air discharge port 12-13. The second cresent shaped static chamber 21 functions as expander communicating with the flame tube 36 through the exhaust intake port 13-14 and with the atmosphere through the exhaust discharge port 15-16. The third crescent shaped static chamber is the oil pump 22 which is located at the bottom. The disposition of the three static chambers in FIGS. 1 and 4 assumes that the rotating assembly turns clockwise. These three static chambers have no direct spatial connection because the shell 54 and the rotor 28 meet at their boundaries 13, 16 and 19 (FIG. 1). However, the first and second static chambers are indirectly connected through the burner assembly 35.

c. Six Dynamic Chambers

To create six separate dynamic chambers, the three intersecting blades 31, 32 and 33 are inserted diametrically in the radial slots between rotor segments 28 in the manner that allows their free radial oscillation. As shown before, both ends of the blades 31, 32 and 33 touch the internal surface of the shell 54 at all angular orientations. The centrifugal force on each blade 31, 32 or 33 tending to throw it outward or to press it against the shell to promote effective sealing is equal to F:

$$F = 0.011 DN^2/g$$

where F is centrifugal force in pounds, D is distance of center of gravity of blade from central axis of rotating assembly in feet, N is rotative speed in revolutions per minute, and g is gravitational constant equal to 32.174 ft/sec². Centrifugal force is directed outward when each blade 31, 32 or 33 passes by the arched portions 11-12, 14-15 and 17-18 (FIG. 1) of the internal surface of the shell 54, locations where sealing is necessary. Along these arched portions of the internal surface of the shell 54 occur high pressure processes such as air compression, expansion and oil discharge. On the other hand, centrifugal force is directed inward when each blade 31, 32 or 33 passes by the plane portions 12-13-14, 15-16-17 and 18-19-11 (FIG. 1) of the internal surface of the shell 54, locations where sealing is not critical. Two dynamic chambers are communicating with each other through each open port along these plane portions of the internal surface of the shell 54. Thus, the blades 31, 32 and 33 are always in satisfactory sealing contact with the shell 54. The longitudinal width of the blades 31, 32 and 33 is constant and substantially equal to the axial spacing between radial notches 25 of the end plates 23 and 29 which axially enclose the engine interior. The blades 31, 32 and 33 have extensions 34 sealing the intersections of the internal surface of the shell 54 and the radial notches 25 of the end plates 23 and 29. As a consequence, the three intersecting blades 31, 32 and 33 define and completely isolate the six dynamic chambers.

2. PRINCIPLE

The invention is effective in performing its functions because there is complete separation between the high and low pressure regions inside the engine. As the rotating assembly turns, each dynamic chamber between two blades continuously increases in volume when passing by the low pressure regions in the first and third crescent shaped static chambers 20 and 22 open to the air intake port 19-11 and oil intake port 16-17, respectively, effecting suction, or when passing by the high pressure region in the second crescent shaped static chamber 21 open to exhaust intake port 13-14 effecting expansion; and it continuously reduces in volume when passing by the high pressure region in the first and third crescent shaped static chambers 20 and 22 open to the air discharge port 12-13 and oil discharge port 18-19, respectively, effecting discharge, or when passing by the low pressure region in the second crescent shaped static chamber 21 open to the exhaust discharge port 15-16 effecting exhaust of combustion by-products. There is no instance when the intake and discharge ports have spatial connection. The transition is when volume of combustion media inside the dynamic chamber is maximum, the intake port has just closed and the discharge port is impending to open.

3. PARTS

The invention has rotating and housing assemblies. The rotating assembly is mounted inside the housing assembly when in turn, is anchored to either a chassis or concrete foundation.

Figure 2:
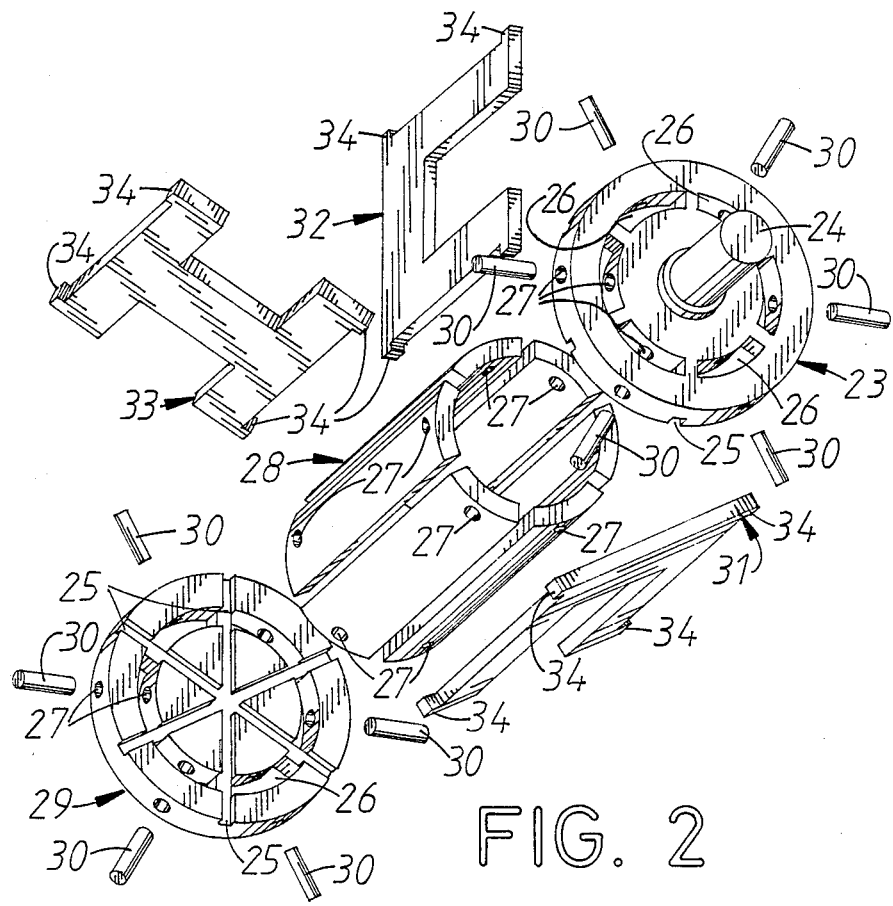
FIG. 2 is the exploded isometric drawing of the rotating assembly.

The rotating assembly shown in FIG. 2 basically consists of the spool-shaped segmented rotor and the three intersecting blades 31, 32 and 33 inserted in its slots. The rotor is made up of two identical end plates 23 and 29 serving as its rim and six arched segments secured at both ends in the arched holes 26 of the former. The end plates 23 and 29 and the arched segments 28 are fastened together by driving dowel pins 30 into their small round holes 27. Outwardly in their central axis, the end plates 23 and 29 have shafts 24 serving as means for transmitting mechanical power. Inwardly in their transverse faces, the end plates 23 and 29 have rectangular radial notches 25 serving as extensions of the rectangular slots between the arched segments 28. Two blades 31 and 32 are U-shaped while the third blade 33 is H-shaped in order to allow their intersection and free radial oscillations in slots of the rotor. Their transverse edges are slidably carried in the radial rectangular notches 25 of the end plates 23 and 29. The blades 31, 32 and 33 have outwardly axial extensions in the rectangular radial notches 25 of the end plates 23 and 29 to seal the outer corners of dynamic chambers formed by the blades 31, 32 and 33, rotor segments 28, end plates 23 and 29 and shell 54. The transverse length of each blade 31, 32 and 33 excluding their extensions 34 is substantially equal to 2.244R which is the distance between opposite internal surfaces of the shell 54 at all angular orientations, measured along one face of the blade.

Figure 3:
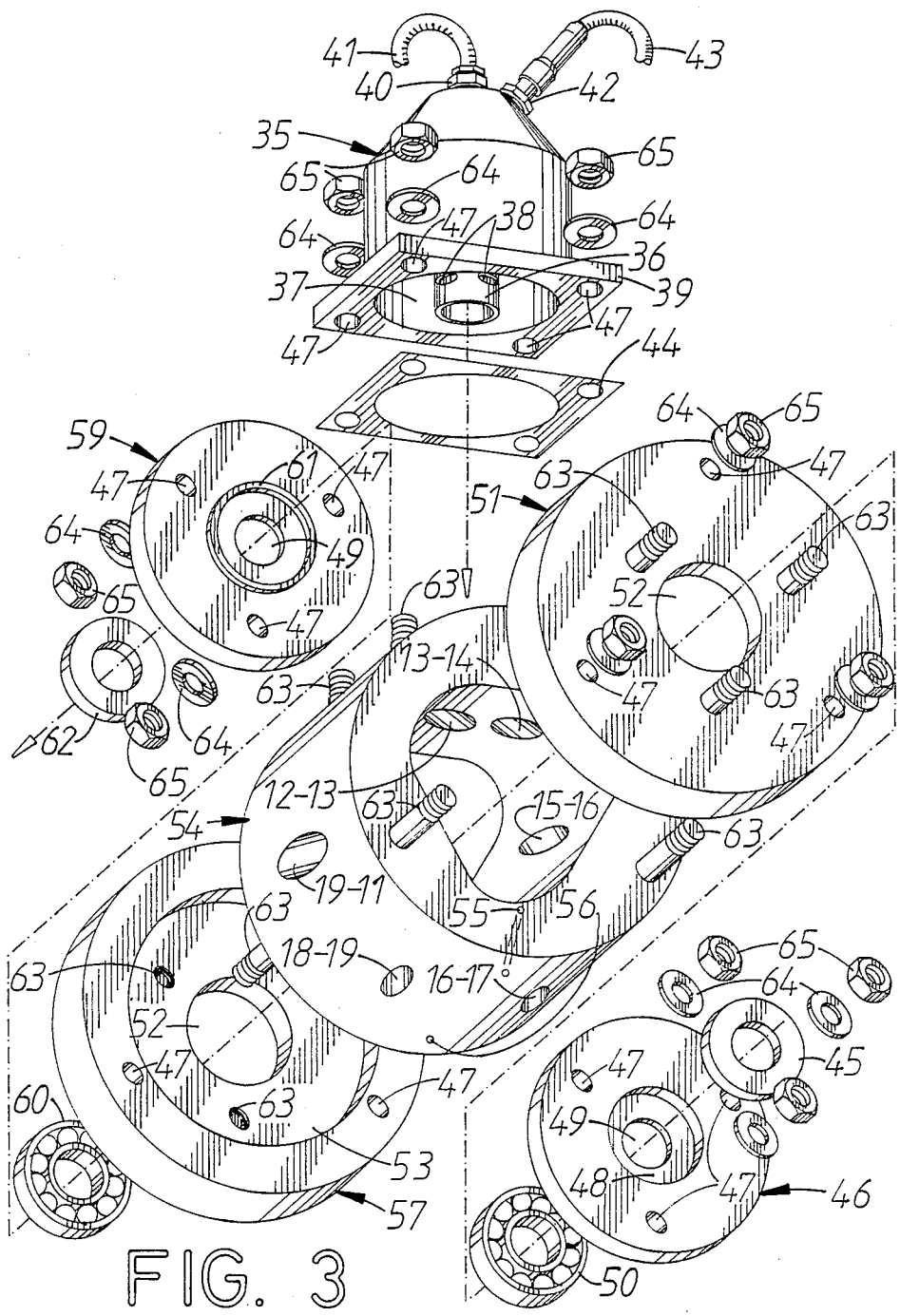
FIG. 3 is the exploded isometric drawing of the housing assembly.
Figure 5:
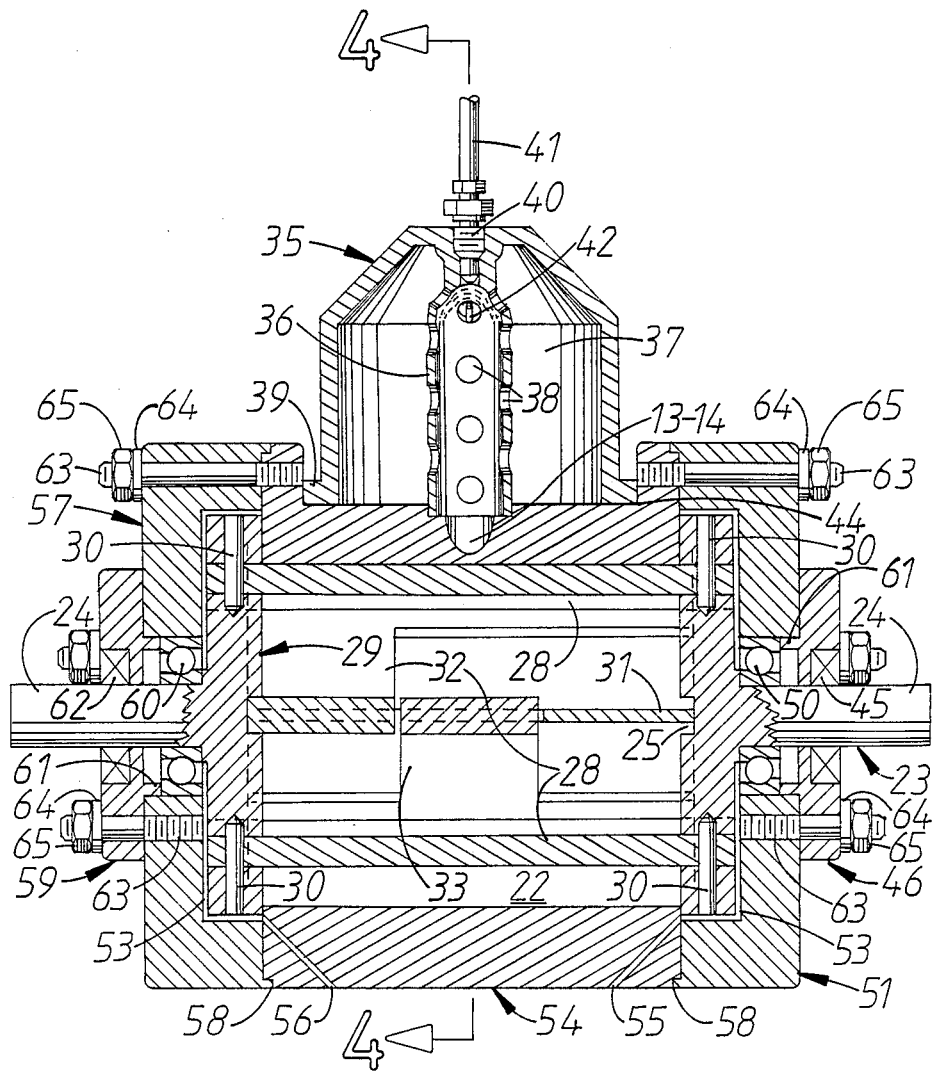
FIG. 5 is the longitudinal section of the invention along section Line 5—5 of FIG. 4.

The invention is symmetrical as seen in FIG. 5, and so is the housing assembly shown in FIG. 3, consisting of shell 54, burner assembly 35 and two identical sets of end walls 51 and 57, bearings 50 and 60, bearing covers 46 and 59, oil seals 45 and 62, stud bolts 63, washers 64 and nuts 65. FIG. 3 is the configuration of the housing assembly.

Three parts comprise the burner assembly 35, namely the hollow cylindrical flame tube 36 with several holes 38 for air passage; with the fuel nozzle 40 at its top (connected to fuel pump by the fuel line 41), and with the spark plug 42 just below the fuel nozzle 40 (connected to the power supply by the cable 43); the air tank 37 for storage of air at high pressure, made up of hollow right cylinder and frustum housing the flame tube 36; and the square flange 39 with gasket 44 for static sealing, bolted to the shell 54.

In the assembled engine, the six rotor segments 28 forming a slotted right cylinder rotatably fit inside the shell 54. If the rotor is viewed as spool-shaped, the end plates 23 and 29 are the rims. The end plates 23 and 29 are journalled for rotation in the recesses 53 of the end walls 51 and 57 but are constrained in axial movement by the transverse faces of the shell 54. This configuration requires that the rotor segments 28 and the end plates 23 and 29 be fastened together after the entire rotating assembly has been mounted inside the shell 54. The three intersecting blades 31, 32 and 33 freely oscillate in the rectangular slots between rotor segments 28 and in the rectangular radial notches 25 of the end plates 23 and 29, as well as virtually touches the shell 54 at both ends and all angular orientations. The end walls 51 and 57 are centralized by rabbet joints 58 with and bolted to the shell 54. The working clearances between the end plates 23 and 29 and the surfaces of the end walls 51 and 57 in their recesses 53 are filled with oil during operation which returns back to the oil sump via small passages 55 and 56 drilled in the shell 54. The shafts 23 are journalled for rotation in the bearings 50 and 60 force fitted in the center holes 52 of the end walls 51 and 57. The bearings 50 and 60 absorb the radial and thrust loads of the rotating assembly as well as restrain its axial and radial movements. The bearing covers 46 and 59 bolted to the end walls 51 and 57, have bosses 61 to keep the bearings 50 and 60 in their proper places; center holes 49 where the shafts 24 pass through; and recesses 48 accommodating the oil seals 45 and 62.

The method of fastening utilizes nuts 65, washers 64 and stud bolts 63 screwed in the shell 54 and end walls 51 and 57. Burner assembly flange 39, end walls 51 and 57 and bearing covers 46 and 59 have bolt holes 47 for this purpose.

4. OPERATION

Figure 6:
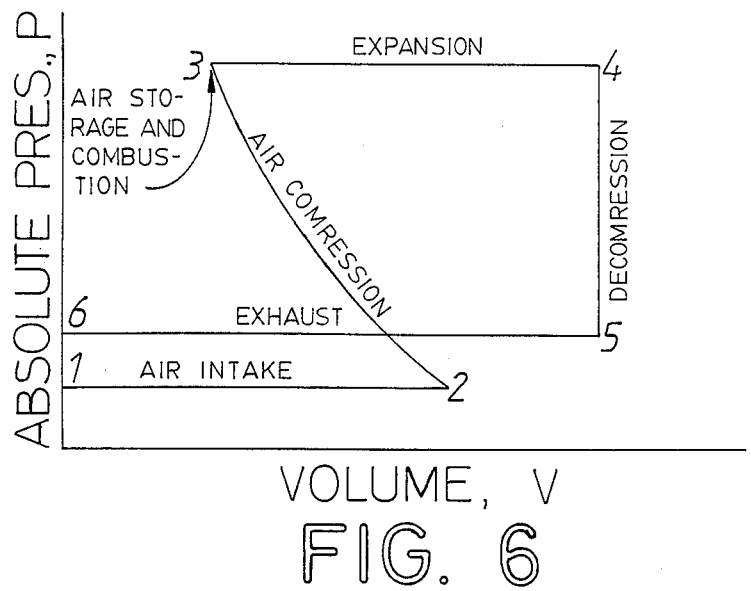
FIG. 6 is the Pressure-Volume (P-V) Diagram of the invention's continuous combustion cycle.
Figure 7:
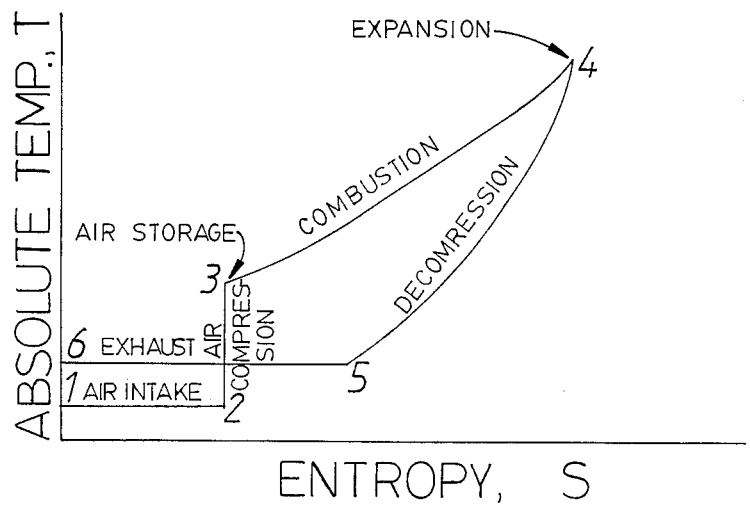
FIG. 7 is the Temperature-Entropy (T-S) Diagram of the invention's continuous combustion cycle.

The invention operates on continuous combustion cycle in accordance with seven operating stages graphically described in FIGS. 6 and 7. The processes involved in the six operating stages and the transition between cycles are permanent with respect to stationary locations inside the engine, but progressively change in each batch of combustion media carried by the dynamic chamber with respect to its location inside the engine. The thermodynamic occurences inside one dynamic chamber are monitored as it travels clockwise from Point 19 in FIG. 1.

a. First Stage: Isobaric and Isothermal Suction of Air (Line 1-2 in FIGS. 6 and 7) occuring in the first crescent shaped static chamber.

Atmospheric air rushes through the air intake port 19-11 into the first crescent shaped static chamber 20 because the dynamic chamber coming forth into view is enlarging and empty as an aftermath of the exhaust stage and transition. The forward advance of the dynamic chamber increases its occupied space which is immediately filled up by atmospheric air. The air intake stops when the volume of the dynamic chamber is maximum at $0.25R^2W$ (where R is rotor radius and W is shell width), the lagging blade is at Point 11 (FIG. 1) when it just leaves the air intake port 19-11, and the leading blade is at Point 12 when the air discharge port 12-13 is impending to open. The entropy increases because the admitted air possesses amount of heat directly proportional to its increasing volume and mass. The temperature and pressure of air inside the dynamic chamber remain the same as those of ambient air till the second stage.

b. Second Stage: Isentropic Air Compression (Line 2-3 in FIGS. 6 and 7) inside the first crescent shaped static chamber.

As the dynamic chamber moves ahead, the air intake port 19-11 is left behind, the air discharge port 12-13 opens up, and the space between rotor 28 and shell 54 diminishes. Since the air tank 37 into which the air discharge port 12-13 leads is pressurized, the air inside the dynamic chamber is compressed without loss of heat. The compression is consummated when the lagging blade is at Location 12 (FIG. 1) when the volume of the dynamic chamber is minimum at $0.02R^2W$, where R and W are the same as before. A little more advance would make the air discharge port 12-13 interconnect the dynamic chamber being followed with the dynamic chamber behind.

Under isentropic condition, both absolute pressure and temperature of the air are inversely related with its volume. The relationships are described by the following formulas, where P and T are absolute pressure and temperature at volume V while p and t are absolute pressure and temperature at volume v:

$$p = P(V/v)^{1.4}$$

$$t = T(V/v)^{0.4}$$

Using the above formulas, the theoretical maximum pressure and temperature in the air tank 37 are computed to be 34 times the absolute pressure and 2.7 times the absolute temperature of the ambient air, respectively. These values must be reduced to compensate for leakage and inefficiencies.

The compression stage produces negative torsional moment owing to the negative pressure gradient across the blades. Therefore, part of mechanical power produced in the second crescent shaped static chamber 21 is used up in this stage.

c. Third Stage: Isobaric, Isochoric, Isothermal and Isentropic Air Storage (Point 3 in FIGS. 6 and 7) inside the air tank.

This stage is shown only as point in both P-V and T-S Diagrams of FIGS. 6 and 7 because the air inflow and outflow through the air tank 37 are equal and uniform, as well as the pressure, volume, temperature and entropy of the air inside the air tank 37 are constant during normal operation. The air storage at high pressure is necessary to promote smooth, even and sufficient flow of air into the flame tube 36.

d. Fourth Stage: Isobaric Combustion (Point 3 in FIG. 6 and Line 3-4 in FIG. 7) inside the flame tube.

Pressurized air inside the air tank 37 enters the flame tube 36 through a number of holes 38. Fuel injected by the fuel nozzle 40 at the top of the flame tube, mixes with incoming air. In the beginning when pressure and temperature are still low, combustion is initiated by one or few high voltage sparks. The spark plug 42 is put off when self-sustaining speed is attained. Pressure escalates until it normalizes with the pressure inside the air tank 37, after which a constant pressure is maintained inside the air tank 37 and the flame tube 36. The combustion process being isobaric, temperature increases from fuel nozzle 40 when combustion just starts to the exhaust intake port 13-14 when combustion ends. This temperature gradient across the combustion zone is invariable during normal operation of the engine.

At dynamic equilibrium, the burning fuel-air mixture flows through the center of the flame tube 36, whereas the pressurized air flows through the periphery of the flame tube 36 to promote cooling of metal parts and preventing deposition of carbon. For the burning fuel-air mixture flows downward through the center, part of the air entering the flame tube 36 through the holes 38 flows backward towards the fuel nozzle with the effect of removing carbon deposits on the surface of the flame tube 36, cooling it 36, the spark plug 42 and the fuel nozzle 40, as well as anchoring the flame near the fuel nozzle 40.

At dynamic equilibrium, whatever mass of air and fuel that comes into the flame tube 36 is also the mass of exhaust gases that exits, hence maintaining constant mass and pressure inside the flame tube 36. The admission and combustion of fresh charge of fuel by air inside the flame tube 36 stresses the combustion zone. To relieve this stress, an equal mass of exhaust gases leaves the flame tube 36 with the dynamic chamber in front. Hence, there is continuous entry of air and fuel, continuous combustion and continuous discharge of exhaust gases when the engine is running. Speed is controlled by regulating the inflow of fuel and air. The engine is stopped by withholding either or both the fuel and air.

The excessive heat given off by the continuous combustion process is transformed into vigorous kinetic energy of the molecules of the gases. Generation of work is initiated as soon as the exhaust gases leave the exhaust intake port 13-14, signalling the start of the fifth stage.

e. Fifth Stage: Isobaric, Isothermal and Isentropic Expansion (Line 3-4 in FIG. 6 and Point 4 in FIG. 7) inside the second cresent shaped static chamber.

This stage is shown only as a point in the T-S Diagram of FIG. 7 because both temperature and entropy can be practically taken as constant. Entropy is invariable at its maximum value because the dynamic chamber is communicatoing through the exhaust discharge port 13-14 with the flame tube 36, the source of heat throughout this stage. Although, the volume and mass of exhaust gases continuously increase, entropy is quantified as constant because the heat addition is accounted for in the combustion stage. Since volume is expanding at constant pressure and entropy, the density and temperature remain constant also. This expansion stage starts when the leading blade is at Location 14 (FIG. 1) and ends when it reaches Location 15, when the exhaust intake port 13-14 has just closed, volume is maximum and the exhaust discharge port 15-16 is impending to open. Since the exhaust intake port 13-14 is always open to the dynamic chamber throughout this expansion stage, the pressure and temperature of the exhaust gases inside the dynamic chamber are the same with those at the exhaust intake port 13-14. Power is created during this stage when differential pressure across the leading blade imparts it with positive tortional moment.

f. Sixth Stage: Isochoric Decompression (Line 4-5 in FIGS. 6 and 7) inside the second cresent shaped static chamber.

As the dynamic chamber moves farther, the exhaust discharge port 15-16 opens up, connecting the pressurized dynamic chamber to the infinite space at atmospheric pressure. The dynamic chamber decompresses instantly, following a slightly slanted and approximately vertical P-V curve. With small error, for simplicity, the decompression stage is assumed to be isochoric process. Nonetheless, final pressure and temperature are still higher than atmospheric because running time is short.

g. Seventh Stage: Isobaric and Isothermal Exhaust (Line 5-6 in FIGS. 6 and 7) inside the second cresent shaped static chamber As the dynamic chamber moves farther, finally, the burnt by-products of combustion exit without change in pressure and temperature through the exhaust discharge port 15-16 due to pressure gradient between the slightly pressurized inside and atmospheric outside of the engine, and because the space between the shell 54 and the rotor 28 reduces to nothing when the lagging blade arrives at Location 16 (FIG. 1). Entropy decreases for the combusion by-product possesses amount of heat which is rejected together with it during exhaust.

h. Transition: Lubricating, Cooling and Sealing Stage (Line 6-1 in FIGS. 6 and 7) inside the third crescent shaped static chamber.

This is not considered an operating stage since there is no combustion media inside the dynamic chamber but it is entirely filled up with oil serving as lubricant, coolant and sealant. From Location 16 to Location 19, the dynamic chamber passes through the third crescent shaped static chamber 22 serving as the oil pump. Oil is intaken through the oil intake port 16-17 and discharged through the oil discharge port 18-19. In the process, oil occupies the clearances between rubbing parts. It functions as lubricant reducing friction as well as sealant regulating leakage of combustion media from high pressure region to low pressure region. The oil also serves as coolant when heat is transferred by conduction from the engine's parts to the intaken oil and that same heat is taken away from the discharged oil by natural convection if the oil is delivered to an open sump, or by conduction to a secondary coolant in a heat exchanger.

The third crescent shaped static chamber 22 serves also as seal between the first and second cresent shaped static chambers 20 and 21. It effectively separates the suction stage from the exhaust stage in the dynamic chamber. As the dynamic chamber sweeps through the third crescent shaped static chamber 22, it is guaranteed to be empty as it emerges in the suction stage ready to receive fresh charge of air again.

What is claimed is:

1. A three chamber continuous combustion engine comprising:
   a. a generally spool-shaped segmented rotor which is rotatably and concentrically mounted inside a sealed housing assembly; and which is made up of:
      i. six arched segments fastened at both ends to two end plates
      ii. said two end plates having arched holes for reception of the ends of the arched segments, and rectangular radial notches slidably carrying the transverse edges of the blades perpendicular to the axis of the rotor
      iii. two shafts in the central axes of the end plates that transmit rotative mechanical energy;
   b. said housing assembly having:
      i. a circumferential internal surface which is generally an equilateral triangle whose corners are replaced with circular arcs, and which forms jointly with the rotor three crescent shaped static chambers;
      ii. three sets of intake and discharge ports corresponding to the three crescent shaped static chambers;
      iii. two end walls with recesses for journalling the end plates for rotation, and with two center holes with bearings for journalling the shafts for rotation;
   c. the first crescent shaped static chamber serving as a compressor that takes in air from the atmosphere at constant pressure and temperature, and compresses it at constant entropy;
   d. an air tank that houses a flame tube, that receives pressurized air from the first crescent shaped static chamber, and that stores air at constant pressure, volume, temperature and entropy;
   e. said flame tube being a hollow cylinder with several holes for air passage, having a fuel nozzle for the introduction of fuel and a spark plug for starting combustion, and serving as the combustion chamber where fuel and air are mixed properly and continuous combustion takes place at constant pressure and volume;
   f. the second crescent shaped static chamber serving as an expander that receives the high pressure products of combustion from the flame tube, that generates mechanical power during expansion of dynamic chambers at constant pressure, temperature and entropy, that decompresses the dynamic chambers at constant volume, and that rids the dynamic chambers of exhaust gases at constant pressure and temperature;
   g. the third crescent shaped static chamber serving as an oil pump that takes in and discharges oil functioning as lubricant, coolant and sealant; and
   h. three intersecting blades of which one is H shaped and the other two are U shaped, having square edges and axial extensions at their outward corners, as well as being inserted slidably in the rotor slots thereby dividing the engine interior into six dynamic chambers carrying combustion media or oil.

* * * * *